United States Patent
Tran et al.

(10) Patent No.: US 8,149,813 B2
(45) Date of Patent: Apr. 3, 2012

(54) WIRELESS DEVICE HAVING FAST-RECEIVE MODE FOR MEASURING RECEIVED SIGNAL STRENGTH (RSSI) FOR HIGHER TIME DIVISION MULTIPLE ACCESS (TDMA) MULTISLOT CLASSES

(75) Inventors: Phat Hong Tran, Waterloo (CA); Oleksiy Kravets, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 903 days.

(21) Appl. No.: 12/190,830

(22) Filed: Aug. 13, 2008

(65) Prior Publication Data

US 2010/0040040 A1  Feb. 18, 2010

(51) Int. Cl.
*H04J 3/00* (2006.01)

(52) U.S. Cl. ........ 370/347; 370/337; 370/338; 370/332; 370/345; 455/78; 455/83; 455/69; 455/553.1

(58) Field of Classification Search .................. 370/347, 370/337, 338, 332, 345; 455/77, 78, 83, 455/69, 553.1; 375/136, 133, 134
See application file for complete search history.

(56) References Cited

U.S. PATENT DOCUMENTS

| | | | | |
|---|---|---|---|---|
| 4,216,545 A | * | 8/1980 | Flickshu et al. | ........... 455/77 |
| 6,556,559 B1 | * | 4/2003 | Mitsume et al. | ........... 370/350 |
| 6,757,261 B1 | * | 6/2004 | Olgaard et al. | ........... 370/280 |
| 6,791,967 B1 | * | 9/2004 | Ishida | ........... 370/345 |
| 2003/0060176 A1 | * | 3/2003 | Heinonen et al. | ........... 455/255 |
| 2004/0001531 A1 | * | 1/2004 | Shuey et al. | ........... 375/136 |
| 2004/0166823 A1 | * | 8/2004 | Alderton | ........... 455/250.1 |
| 2004/0185791 A1 | * | 9/2004 | Hammes et al. | ........... 455/67.14 |
| 2009/0036114 A1 | * | 2/2009 | Mohebbi | ........... 455/422.1 |

OTHER PUBLICATIONS

European Search Report for EP Application No. 08162333.2 mailed Jan. 20, 2009.
European Search Report from corresponding EP Application dated May 6, 2011.

* cited by examiner

*Primary Examiner* — Ricky Ngo
*Assistant Examiner* — Rasheed Gidado
(74) *Attorney, Agent, or Firm* — Gowling Lafleur Henderson LLP (57) ABSTRACT

A wireless communications device having a fast-receive mode for measuring received signal strength indication (RSSI) enables the device to handle higher time division multiple access (TDMA) multislot classes without requiring that the device include either a second receiver or a receiver with a more advanced and expensive phase-locked loop (PLL) design. The time to complete an RSSI measurement is reduced by initiating the sampling of signal strength before the radio transceiver is fully stabilized in the downlink mode. By initiating sampling before PLL stabilization is complete, the overall time to complete an RSSI measurement is reduced sufficiently to enable scheduling of an RSSI measurement in each GSM frame.

20 Claims, 7 Drawing Sheets

*FIG. 7 (fast RSSI Measurement)*

WIRELESS DEVICE HAVING FAST-RECEIVE MODE FOR MEASURING RECEIVED SIGNAL STRENGTH (RSSI) FOR HIGHER TIME DIVISION MULTIPLE ACCESS (TDMA) MULTISLOT CLASSES

CROSS-REFERENCE TO RELATED APPLICATIONS

This is the first application filed for the present technology.

TECHNICAL FIELD

The present technology relates generally to wireless communications and, more particularly, to wireless communications that utilize time division multiple access (TDMA).

BACKGROUND

Received Signal Strength Indication (RSSI) is a measurement of the power present in a received radio signal. The RSSI measurements are used by a wireless communications device to determine the signal strengths of radio signals emanating from base stations in the vicinity of the device. The RSSI measurements enable the device to ascertain which base station is currently providing the optimal wireless link and when to perform a handover from one base station to another.

In a typical time division multiple access (TDMA) radio-access technology (RAT) implementation, such as GSM/GPRS/EDGE, at least one RSSI measurement is made per frame for voice calls or data transfer. Thus, for a GSM-based implementation, since each GSM frame has only 8 timeslots, an RSSI measurement must be scheduled within one or more of the timeslots. Where only a single downlink slot and a single uplink slot are used, there is generally no problem scheduling at least one RSSI measurement per GSM frame.

However, GPRS/EGPRS wireless devices and mobile phones may utilize multislot classes. This technology enables more than one downlink timeslot or more than one uplink timeslot per frame. A multislot class can have a value between 1 and 45. For example, a class 10 multislot device, which is currently quite prevalent, uses a maximum of 4 timeslots in the downlink direction and 2 timeslots in the uplink direction. However, the total number of timeslots per frame may not, for class 10, exceed 5. Thus, the network configures either 4 Rx+1 Tx or 3 Rx+2 Tx (meaning 4 downlink slots plus 1 uplink slot, or 3 downlink slots plus 2 uplink slots). Multislot classes with a class rating of 31 or higher are deemed to be high (or "higher") multislot classes. These higher multislot classes are to utilize 6 or 7 timeslots per frame for either uplink or downlink. For example, a multislot class 32 would employ 5 downlink slots and 3 uplink slots with a maximum of 6 timeslots.

In these higher multislot classes, however, there is generally insufficient space to perform an RSSI measurement because of the substantial time required to stabilize the phase-locked loop of the receiver. One inadequate solution would be to implement a highly advanced and expensive PLL design in the device; however, this is not cost-effective for consumer wireless devices. Another solution would be to employ more than one receiver, but the use of an extra transceiver chip is not only expensive but also adds unwanted bulk to the device. For Evolved EDGE, which will require a second receiver, operating both receivers consumes more power than would be desirable. There is therefore a need for a solution to one or more of the foregoing problems.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology enables a wireless communications device to utilize higher TDMA multislot classes without requiring a second receiver or without requiring that the transceiver chip implement an advanced and expensive phase-locked loop (PLL) design. The wireless communications device implements higher TDMA multislot classes by reducing the time required to complete a received signal strength indication (RSSI) measurement. The time required to complete an RSSI measurement is reduced by initiating the collection of RSSI signal samples prior to complete stabilization of the PLL. The wireless communications device can thus operate in two distinct receiver modes, a normal receive mode in which the TDMA data is received and a fast receive mode (or dedicated, lower-power RSSI measurement mode) in which the device does not wait for the PLL to stabilize prior to commencing the collection of signal strength samples. By performing the steps of PLL stabilization and signal sample collection substantially in parallel, or at least partially in parallel, the total time required for measuring RSSI can be reduced to an amount that can be fitted (i.e. scheduled) within the remaining space available in one of the timeslots of the frame. This novel technique enables the device to receive data in one mode while measuring RSSI in another mode. Even if the receiver is not exactly on-frequency during the RSSI measurement, a useful signal strength reading can nonetheless be obtained.

Thus, a main aspect of the present technology is a method of transmitting and receiving data using a wireless communications device that is enabled for higher multislot classes in which a plurality of uplink timeslots of each TDMA frame is reserved for transmitting data and a plurality of downlink timeslots of each TDMA frame is reserved for receiving data. This novel method comprises steps of receiving TDMA data on at least one of the plurality of downlink timeslots reserved for receiving data, switching a transceiver of the wireless communications device from a receiver mode to a transmitter mode, transmitting TDMA data on at least one of the plurality of uplink timeslots reserved for transmitting data, switching the transceiver of the wireless communications device from the transmitter mode to the receiver mode, and measuring, with the transceiver operating in the receiver mode, a received signal strength indication (RSSI) by initiating collection of RSSI signal samples prior to complete stabilization of a phase-locked loop (PLL) of the transceiver.

In one implementation of this aspect of the technology, the step of measuring the RSSI comprises steps of programming the transceiver for the receiver mode, initiating stabilization of the PLL, initiating collection of RSSI signal samples while the PLL is still stabilizing, and terminating the receiver mode when a maximum number of RSSI signal samples have been collected, wherein the maximum number of RSSI signal samples is constrained by a remaining space available in a timeslot during which the RSSI is to be measured.

In another implementation of this aspect of the technology, the step of measuring the RSSI comprises initiating collection of RSSI signal samples once the phase-locked loop has stabilized the frequency of a local oscillator to within, for example, 20 kHz of the carrier frequency. It will be appreciated that this 20 kHz value is only presented by way of illustration, and any other suitable frequency differential could be used based on the specific parameters of the device.

In yet another implementation of this aspect of the technology, the step of measuring the RSSI comprises initiating collection of RSSI signal samples once the phase-locked loop has stabilized the frequency of a local oscillator to within, for example, 10 kHz of the carrier frequency. It will be appreciated that this 10 kHz value is only presented by way of illustration, and any other suitable frequency differential could be used based on the specific parameters of the device.

Another main aspect of the present technology is a computer program product that includes code adapted to perform the steps of any of the foregoing methods when the computer program product is loaded into memory and executed on a processor of a wireless communications device.

Yet another main aspect of the present technology is a wireless communications device enabled for higher multislot classes in which a plurality of uplink timeslots of each TDMA frame is reserved for transmitting data and a plurality of downlink timeslots of each TDMA frame is reserved for receiving data. The device comprises a radiofrequency transceiver having a phase-locked loop for locking the phase of a local oscillator of the transceiver to the phase of a carrier signal, and a processor for instructing the radiofrequency transceiver to switch between a normal data-receiving mode in which TDMA data is received on reserved downlink slots and a dedicated RSSI-measurement mode for measuring a received signal strength indication (RSSI) wherein collection of RSSI signal strength samples is initiated prior to complete stabilization of the phase-locked loop.

In one implementation of this aspect of the technology, each TDMA frame has eight timeslots of which at least six timeslots are reserved for either data transmission or data reception.

In another implementation of this aspect of the technology, each TDMA frame has eight timeslots of which at least seven timeslots are reserved for either data transmission or data reception.

In yet another implementation of this aspect of the technology, the radiofrequency transmitter operates at a lower power when operating in the dedicated RSSI measurement mode.

The details and particulars of these aspects of the technology will now be described below, by way of example, with reference to the attached drawings.

Figure 1:
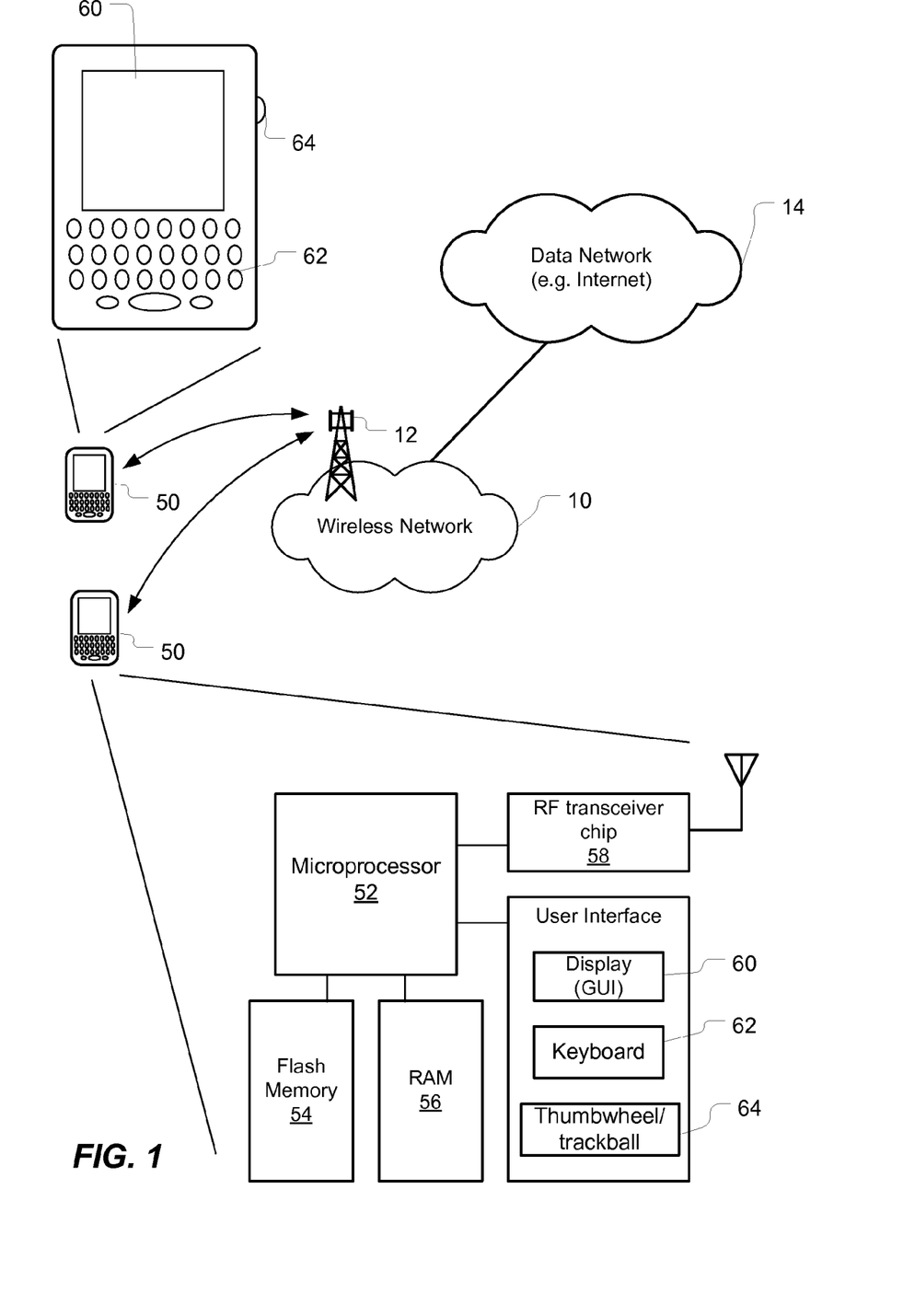
FIG. 1 is a schematic depiction of a wireless network and a wireless communications device on which the present technology can be implemented.

FIG. 1 is a schematic depiction of a wireless network and a wireless communications device on which the present technology can be implemented.

For the purposes of this specification, the expression "wireless communications device" is meant to encompass a broad range of portable or mobile communication devices such as smart phones, cell phones, satellite phones, wireless-enabled PDA's or wireless-enabled Pocket PCs or tablets, and any other device that is capable of exchanging data over a radiofrequency channel or wireless link.

FIG. 1 depicts schematically a wireless network 10 which, in this case, is a TDMA-based mobile communications network such as a GSM network. The wireless network 10 has at least one base station tower 12 for communicating over radio frequencies with a wireless communications device 50. The wireless network 10 may also be connected to a data network such as, for example, the Internet through which the wireless communications device 50 can exchange and obtain data. The wireless communications device 50 may have both voice and data capabilities (optionally for both e-mail and Web browsing) The wireless communications device 50 includes a processor or microprocessor 52 that is operatively coupled to memory (e.g. Flash Memory 54 and RAM 56) and a radiofrequency transceiver (e.g. the RF transceiver circuitry or RF chip 58) for transmitting and receiving voice and data. Furthermore, the wireless communications device may include a display or graphical user interface 60, e.g. an LCD screen, a keyboard/keypad 62 and an optional thumbwheel or trackball 64.

Figure 2:
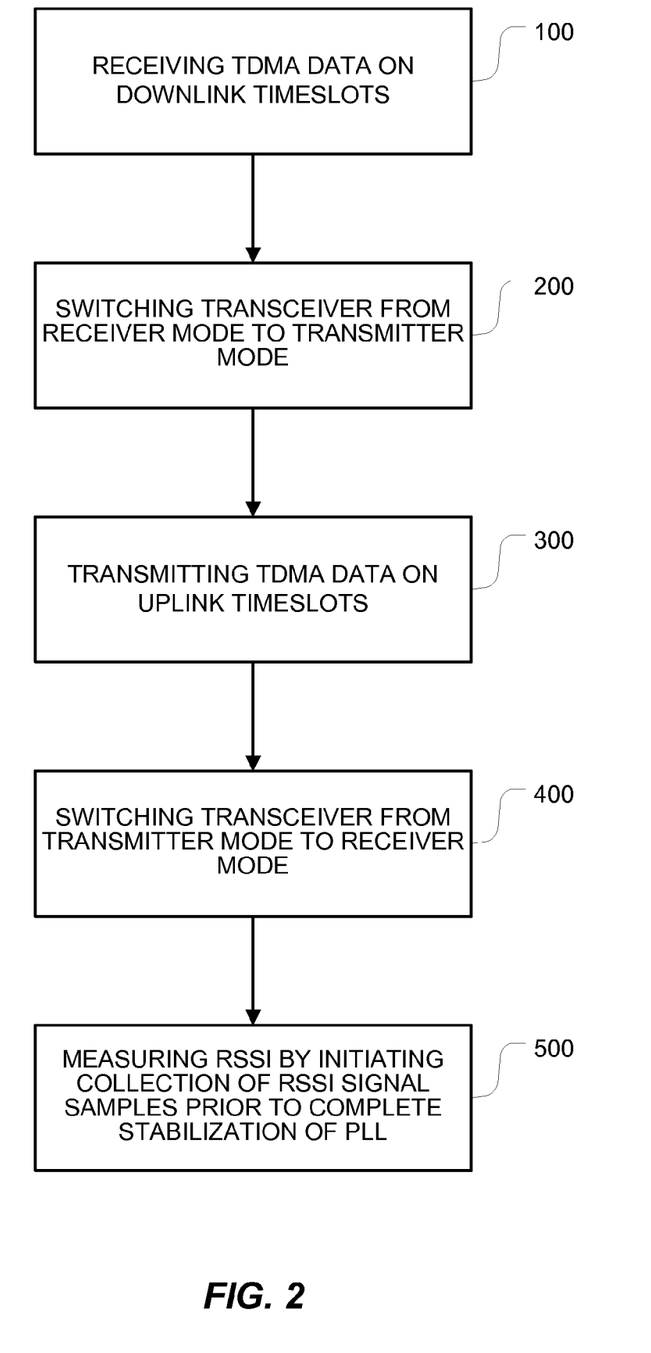
FIG. 2 is a flowchart outlining some of the main steps of a method of enabling a wireless communications device to implement higher TDMA multislot classes in accordance with one or more implementations of the present technology.

FIG. 2 is a flowchart outlining some of the main steps of a method of enabling a wireless communications device to implement higher TDMA multislot classes in accordance with one or more implementations of the present technology. This novel method enables the transmitting and receiving of data using a wireless communications device that is enabled for higher multislot classes in which a plurality of uplink timeslots of each TDMA frame is reserved for transmitting data and a plurality of downlink timeslots of each TDMA frame is reserved for receiving data. As depicted in FIG. 2, the novel method generally involves a step 100 of receiving TDMA data on at least one of the plurality of downlink timeslots reserved for receiving data. The method further includes a step 200 of switching a transceiver of the wireless communications device from a receiver mode to a transmitter mode. The method also includes a step 300 of transmitting TDMA data on at least one of the plurality of uplink timeslots reserved for transmitting data. The method further includes a step 400 of switching the transceiver of the wireless communications device from the transmitter mode to the receiver mode. The method further involves a step 500 of measuring, with the transceiver operating in the receiver mode, a received signal strength indication (RSSI) by initiating collection of RSSI signal samples prior to complete stabilization of a phase-locked loop (PLL) of the transceiver.

Figure 3:
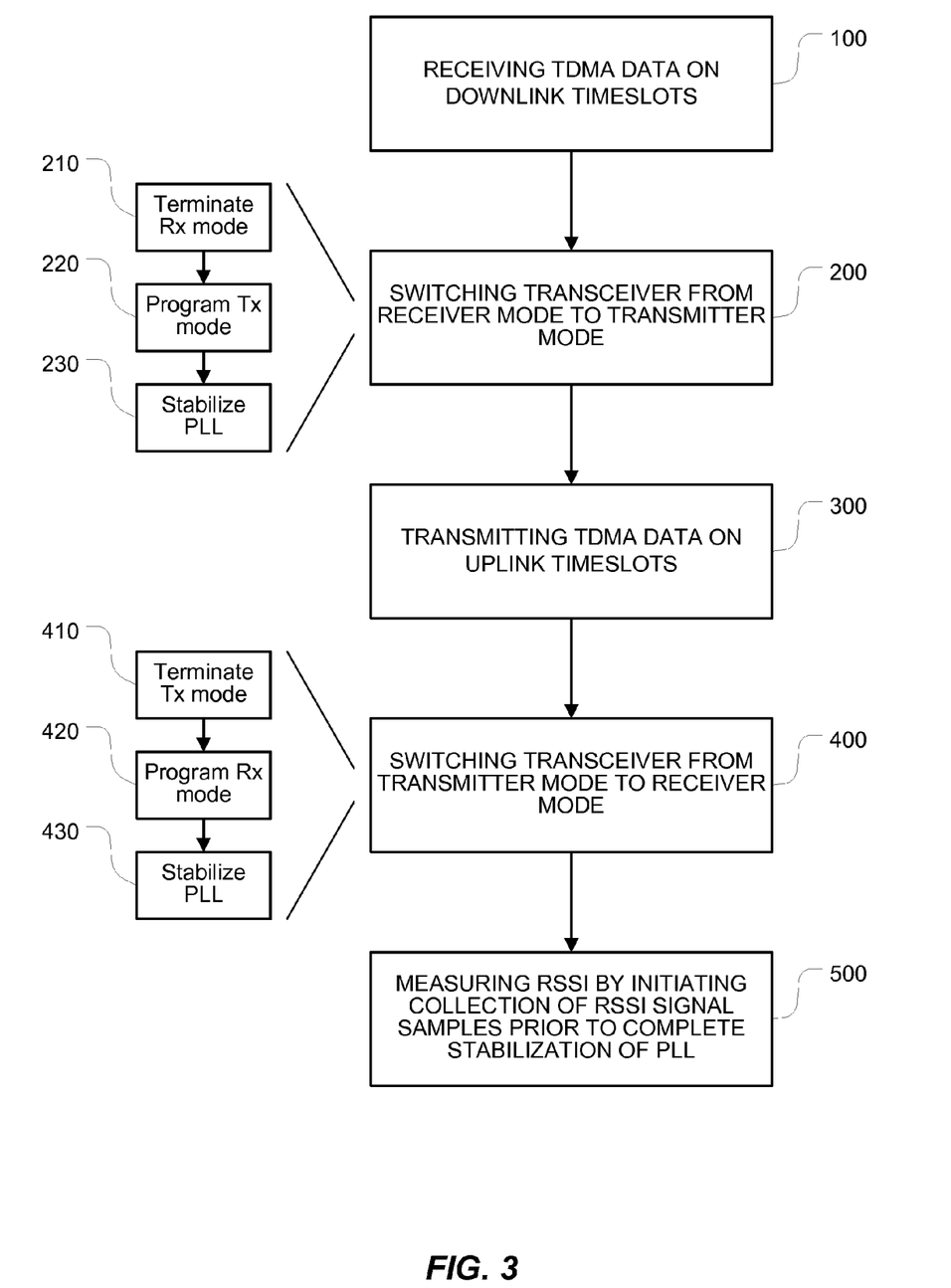
FIG. 3 is a flowchart depicting some of the specific steps involved in switching over from one mode to another mode.

In one implementation of this technology, as depicted in FIG. 3, the step 200 of switching the transceiver from the receiver mode to the transmitter mode entails a step 210 of terminating the receiver mode, a step 220 of programming the transceiver for the transmitter mode, and a step 230 of stabilizing the PLL for the transmitter mode.

In one implementation of this technology, as further depicted in FIG. 3, the step 400 of switching the transceiver from the transmitter mode to the receiver mode entails a step 410 of terminating the transmitter mode, a step 420 of programming the transceiver for the receiver mode, and a step 430 of stabilizing the PLL for the receiver mode.

Figure 4:
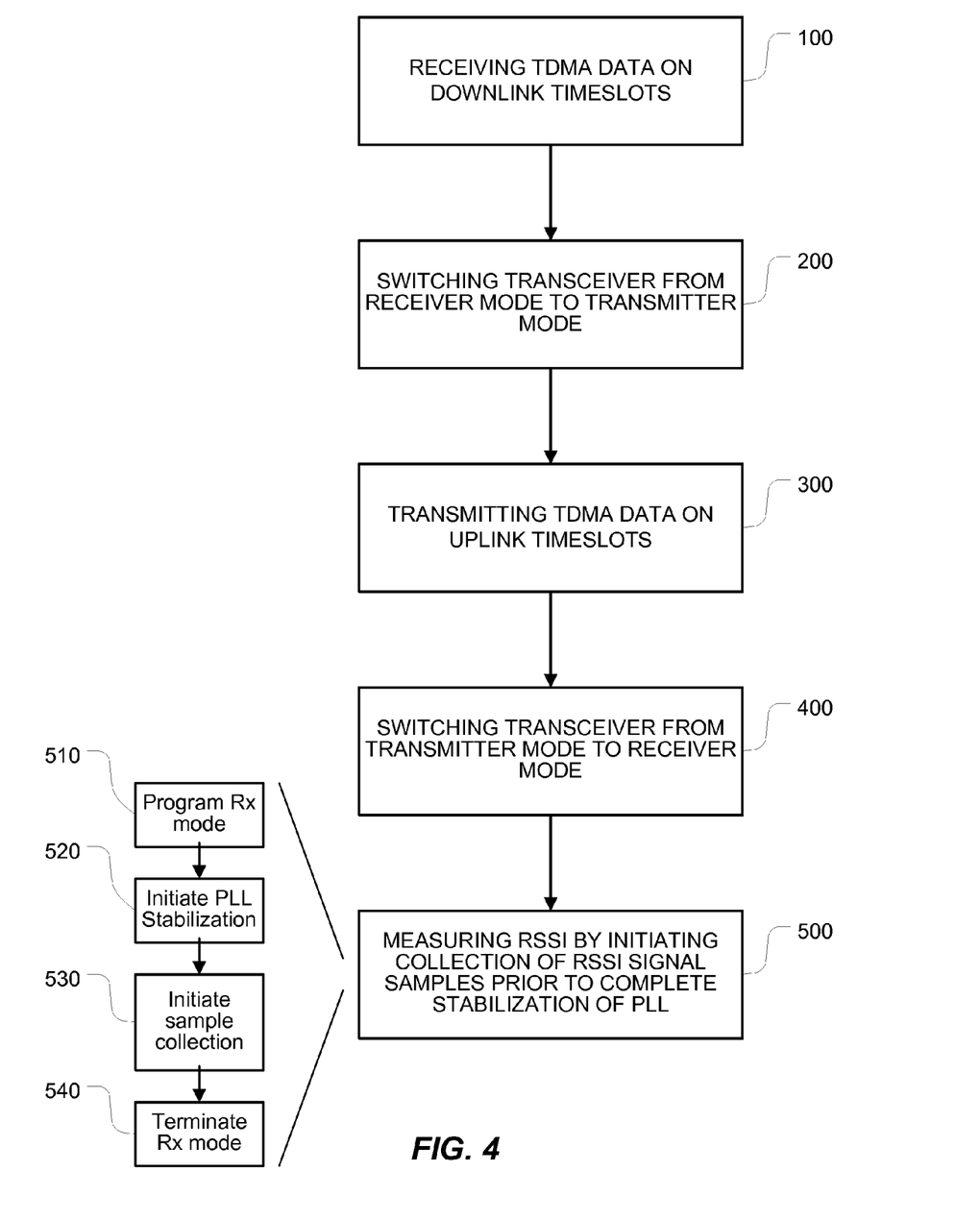
FIG. 4 is a flowchart depicting some of the specific steps involved in measuring the RSSI.

In one implementation of this technology, as depicted in FIG. 4, the step of measuring the received signal strength indication (RSSI) entail a step 510 of programming the transceiver for the receiver mode, a step 520 of initiating stabilization of the PLL, a step 530 of initiating collection of RSSI signal samples while the PLL is still stabilizing, and a step 540 of terminating the receiver mode when a maximum number of RSSI signal samples have been collected, wherein the maximum number of RSSI signal samples is constrained by a remaining space available in a timeslot during which the RSSI is to be measured.

In one specific implementation, the step 500 of measuring the received signal strength indication (RSSI) comprises initiating collection of RSSI signal samples once the phase-locked loop has stabilized the frequency of a local oscillator to within 20 kHz of the carrier frequency. In a variant of this implementation, the onset of sample collection can be deferred until the local oscillator has stabilized to within 10 kHz of the carrier frequency. These values, it should be appreciated, are provided merely by way of example to illustrate an approximate frequency differential (or "error") that can be tolerated for the purposes of initiating collection of signal strength samples. By initiating collection of RSSI samples before the PLL associated with the local oscillator has fully stabilized, a substantially more rapid RSSI measurement can be obtained, thus enabling the RSSI measurement to be scheduled in the remaining space in a given timeslot. Since the RSSI measurement can be scheduled in the space remaining in one of the timeslots of the frame, the higher multislot classes can be implemented. This novel technique enables higher multislot classes to be implemented without resorting to the undesirably expensive solution of utilizing a very advanced PLL design or using a second receiver. Use of a second transceiver chip not only increases cost but also augments the "silicon space" inside the device (thus increasing the overall bulk of the device). For a mobile device, where both low cost and small size are paramount concerns, this is clearly disadvantageous. In contrast, the present technology enables the device to use higher multislot classes with a standard PLL design and only a single transceiver chip (i.e. only one receiver). Even for Evolved EDGE devices, where a second receiver is mandated by the standard, this novel technology is useful because the second receiver can either be shut off or powered down to thereby reduce power consumption and thus prolong battery life.

Since RSSI measurements are done at least once every frame, the timing analysis presented below by way of example illustrates why an RSSI measurement cannot be scheduled into a typical eight-slot GSM frame in the case of higher multislot classes.

Figure 5:
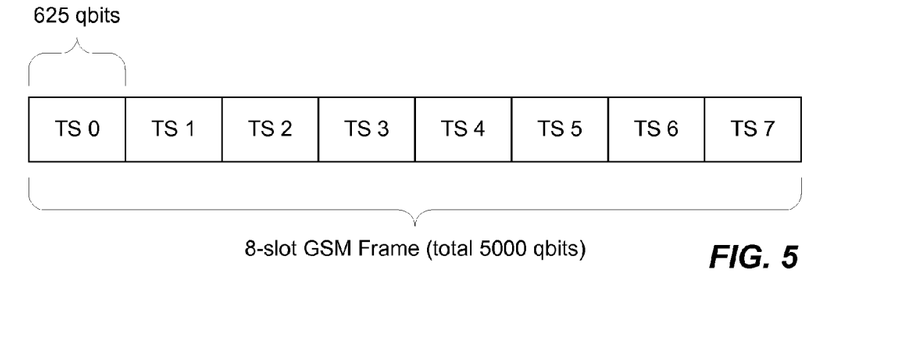
FIG. 5 is a schematic depiction of an eight-timeslot GSM frame.

As shown in FIG. 5, the duration of the 8-slot GSM frame is calculated as follows: 8 time slots*625 GSM quarter bits (qbits) per slot=5000 qbits. For the purposes of illustration, an example calculation is presented below for a typical class 10 implementation having 4 downlink timeslots and 2 uplink timeslots. The qbit values are presented merely by way of example to illustrate the underlying principle that (when using the prior-art approach) there is inadequate space available for performing an RSSI measurement in one of the timeslots of the frame. It should of course be understood that these values may vary depending on the particular attributes of the network and on the characteristics of the transceiver in the wireless communications device.

Figure 6:
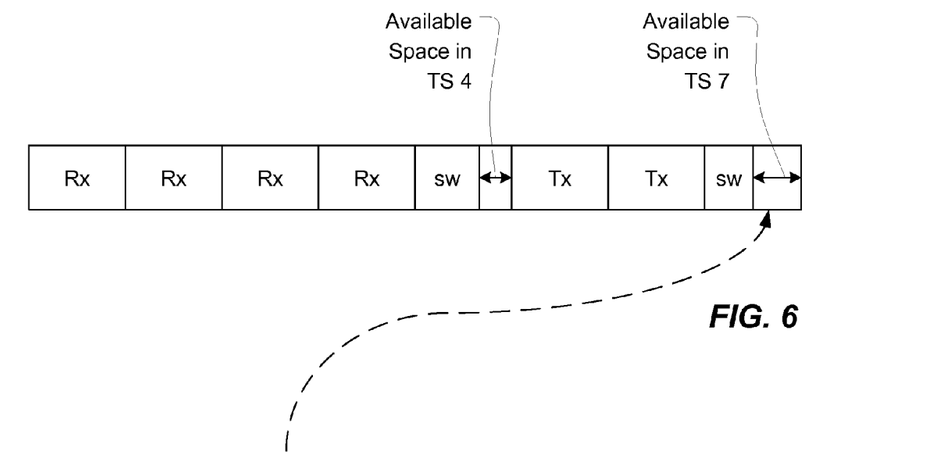
FIG. 6 is a schematic depiction of the GSM frame of FIG. 5 configured for a 4 Rx+2 Tx multislot class.

As shown in FIG. 6, yn the worst case frame structure for the 4 timeslots used for downlink data, 2 timeslots used for uplink data and 1 RSSI measurement, the timeslots would be occupied as follows:

1. Slots 0-3 occupied by 4 downlink slots (Rx).
2. Slot 4:
   a) terminating Rx mode (114 qbits);
   b) potential space (1) for RSSI (625−(114+98+222)=191 qbits);
   c) programming radio transceiver for uplink (Tx) operation (98 qbits);
   d) stabilizing (settling) radio transceiver in uplink (Tx) mode (PLL stabilization, etc.) (222 qbits)
3. Slots 5,6 occupied by 2 uplink slots (Tx).
4. Slot 7:
   a) terminating Tx mode (39 qbits);
   b) potential space (2) for RSSI (625−(39+100+118)=368 qbits)
   c) programming radio transceiver for next frame downlink operation (next frame slots 0-3 Rx) (100 qbits)
   d) stabilizing radio transceiver in downlink (Rx) mode (PLL stabilization, etc.) (118 qbits)

It bears underscoring that the foregoing values are merely presented by way of example to illustrate the underlying principle.

In this particular example, the time required for performing one (1) RSSI measurement can be calculated as follows:
1. Programming the radio transceiver for the Rx mode (100 qbits)
2. Stabilizing the radio transceiver in the downlink (Rx) mode (PLL stabilization, etc.) (118 qbits)
3. Receiving 100 samples for RSSI calculation (400 qbits)
4. Terminating the Rx mode (114 qbits)

In this specific example, the total number of quarter bits needed to perform one RSSI calculation is equal to 732 qbits. This is problematic since there are only 368 qbits of space available in this example. Thus, in this example, it is not possible to schedule an RSSI measurement into this GSM frame. Again, it should be understood that these values are presented merely by way of example. The values may vary depending on the specific attributes of the network and the specific characteristics of the transceiver in the wireless device.

Figure 7:
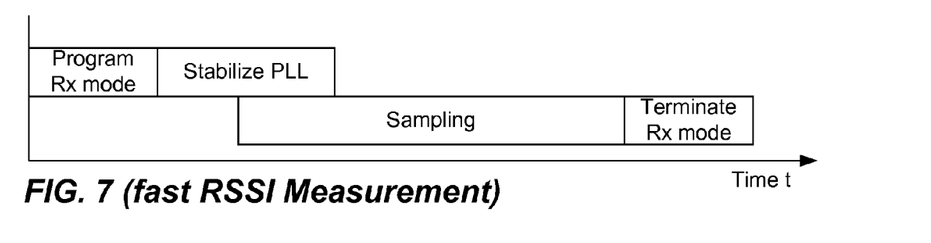
FIG. 7 is a schematic depiction of a novel technique of initiating RSSI sampling prior to complete stabilization of the PLL.
Figure 8:
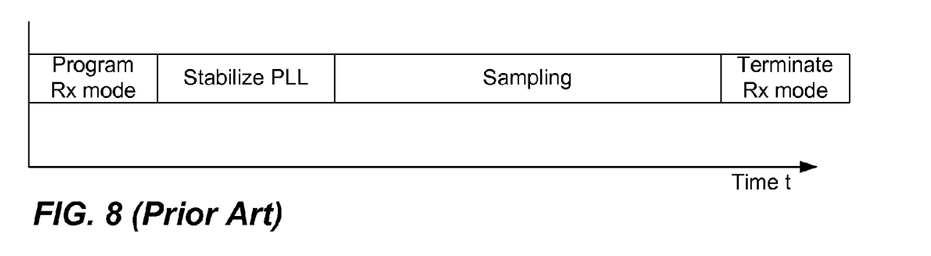
FIG. 8 is a schematic depiction of the prior art approach of serially stabilizing the PLL prior to initiating the sampling of the signal strength.

Using the novel technology described herein, however, it is possible to fit an RSSI measurement into this typical right-timeslot GSM frame. To fit the RSSI measurement into the available space remaining in one of the timeslots of the frame, the total time needed to measure RSSI is reduced. As depicted schematically in FIG. 7, the total time needed for an RSSI measurement is reduced by initiating the collection of signal samples prior to complete stabilization of the phase-locked loop (PLL) of the receiver. In other words, the wireless communications device begins to collect signal strength (RSSI) samples and sent these collected samples to a digital signal processor (DSP) prior to complete stabilization of the PLL. Thus, the step of PLL stabilization occurs at least partially in parallel with the step of signal strength sample collection. By at least partially overlapping the sample collection and the PLL stabilization, the total time required for an RSSI measurement is significantly reduced. In contradistinction, in the prior art, the steps of programming the Rx mode, stabilizing the PLL, sampling and termination of the Rx mode were performed serially, i.e. in a non-overlapping sequence, as shown schematically in FIG. 8.

The processor of the wireless device can be configured to cause the radiofrequency transceiver to collect a maximum number of RSSI signal samples, where the maximum number is constrained by the remaining space available in a timeslot during which RSSI is measured. In other words, if the remaining space in a given timeslot is x qbits, then the processor can be configured to collect the maximum number of samples so that all of the space in that timeslot is used for switchover from Tx mode to Rx (or vice versa), which is governed by transceiver properties, and the RSSI measurement. Thus, the RSSI measurement can be made as long as possible (to improve accuracy) by sampling for as long as possible, even if the PLL has only begun to stabilize.

As will be appreciated, there is an engineering trade-off between the time reduction and the accuracy of the resulting RSSI measurement. By reducing the total time required to measure RSSI by collecting samples without waiting for full PLL stabilization to occur, the initial sampling tends to be inaccurate (although this sampling, of course, become increasingly more accurate as the PLL stabilizes). Since the PLL converges or "decays" toward stabilization, samples collected at the very beginning are least accurate. As time progresses and the PLL stabilizes, the inaccuracy of the sampling decreases until the samples become reasonably accurate, at least for the purposes of measuring or estimating the RSSI. Even being off-frequency by, for example, 10-20 kHz is sufficient for getting a useful RSSI reading.

Determining when to initiate sample collection can be accomplished in different ways. One approach is to determine how much space is available in a given timeslot in which the RSSI is to be measured, and then to work backward to determine, based on how many samples are needed, when to begin sample collection. Another approach is to commence the collection of samples at a fixed point in the timeslot, e.g. at the midpoint of the timeslot, in which case only a fixed number of samples will ever be collected, and therefore the RSSI measurement will only be based on that set of samples. A "time lag" between initiation of stabilization and initiation of sample collection can thus be defined. This time lag can optionally be made a configurable parameter.

Another approach is to initiate sample collection as soon as PLL stabilization has progressed beyond a predetermined threshold, i.e. when the PLL output frequency is reasonably close to the target frequency, and then to employ an algorithm that takes into account the increasing accuracy of the sampling as the PLL converges/stabilizes.

In yet another approach, the time to stabilize the PLL to within 10 kHz or 20 kHz (or some other arbitrary frequency differential) of the carrier frequency can be determined a priori and then used to determines how many samples to collect. The device would then collect x samples representing 4x qbits where x=((625 qbits per timeslot)−(time required for switching from the transmitter mode to the receiver mode)−(time to program the transceiver for RSSI measurement in the receiver mode)−(time to stabilize the PLL to within 20 kHz of the carrier frequency)−(time to terminate the receiver mode once RSSI measurement is complete))/4. This calculation would be used if the designated timeslot for performing the RSSI measurement is Timeslot #7 (the eighth timeslot) in the 4 Rx+2 Tx multislot example presented above.

Alternatively, the value of x can be determined as x=((625 qbits per timeslot)−(time required for switching from the receiver mode to the transmitter mode)−(time to program the transceiver for RSSI measurement in the receiver mode)−(time to stabilize the PLL to within 20 kHz of the carrier frequency)−(time to terminate the receiver mode once RSSI measurement is complete))/4. This calculation would be used if the designated timeslot for performing the RSSI measurement is Timeslot #4 (the fifth timeslot) in the 4 Rx+2 Tx multislot example presented above. As was the case in the specific example presented above, it will often be the case that one of the two timeslots offers more available space than the other one, and is thus the prime candidate for scheduling the RSSI measurement. If, by happenstance, the Rx-Tx switchover time is the same as the Tx-Rx switchover time, then the available space in the two potentially usable timeslots is identical, and it therefore becomes merely a matter of design choice as to which one to employ. For even higher multislot classes where there are seven (7) timeslots devoted to data transmission and reception and thus only one (1) timeslot potentially available for RSSI, then no comparison is required. Depending on whether the available timeslot follows the Tx mode or the Rx mode, the appropriate calculation is used to determine how many samples can be collected (assuming the latter approach of initiating sampling only once the PLL has converged to within a predetermined frequency differential).

Figure 9:
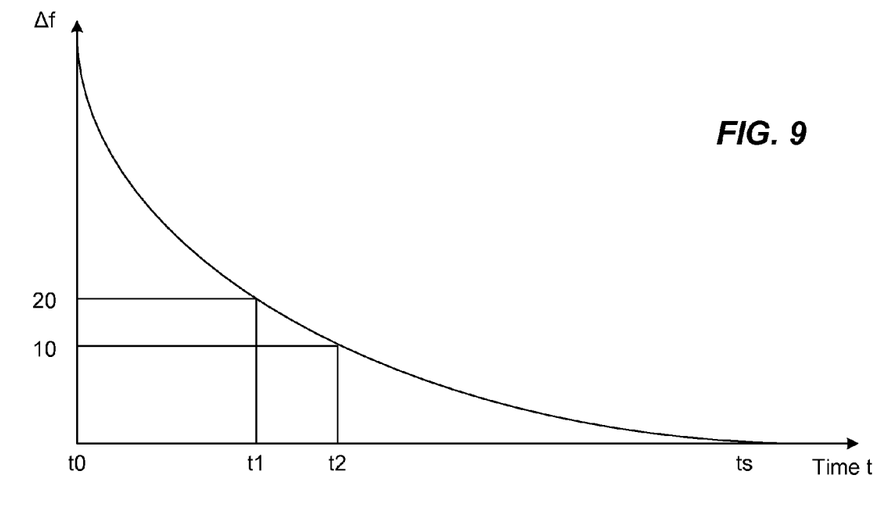
FIG. 9 is a graph schematically illustrating the stabilization of a PLL as a function of time.
Figure 10:
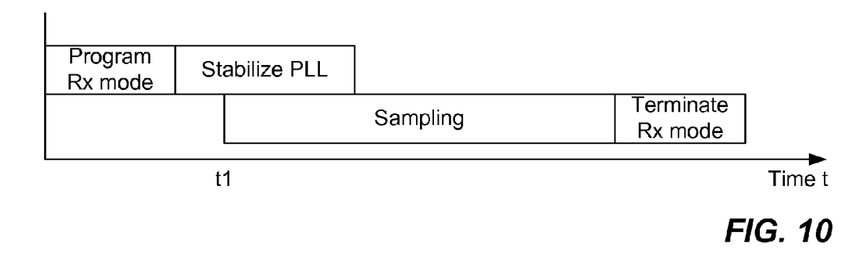
FIG. 10 is a schematic depiction of a technique of initiating sampling at a time t1 that is prior to a time ts corresponding to complete stabilization of the PLL.
Figure 11:
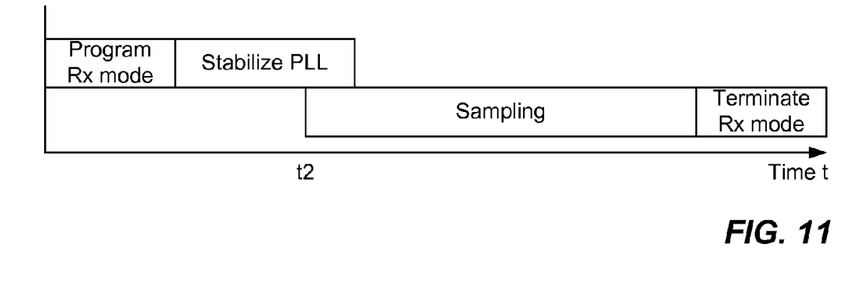
FIG. 11 is a schematic depiction of a technique of initiating sampling at a time t2 that is prior to a time ts corresponding to complete stabilization of the PLL.

FIG. 9 is a graphical depiction of the stabilization of the PLL over time. In this graph, a frequency differential of 20 kHz (or other arbitrary value) corresponds to time t1 whereas a frequency differential of 10 kHz (or other arbitrary value) corresponds to time t2. Time ts corresponds to the complete stabilization time. In this novel technique, sampling begins prior to ts, such as, for example, at t1 or at t2. Below FIG. 9 are two time-based bar graphs (FIG. 10 and FIG. 11) showing that the sampling is at least partially in parallel with the PLL stabilization. Indeed, it is possible to commence sampling as soon as the PLL output frequency closes in on the target frequency.

This novel method therefore employs a dedicated low-power receive mode (distinct from the normal receive mode) for measuring the received signal strength indication (RSSI). This dedicated low-power receive mode (also referred to herein as a fast receive mode) eliminates the need to set up the receiver in a normal receive mode for measuring RSSI, which is too time-consuming to fit within the available space in the timeslot. Thus, the method switches the transceiver on the wireless device between a normal receive mode for receiving TDMA data and a fast receive mode for performing the RSSI measurement.

This novel technology enables implementation of the 4-2 multislot class (4 downlink and 2 uplink) in EDGE (Enhanced Data rates for GSM Evolution) and can also be used to implement higher multislot classes in which six or seven of the eight timeslots of the GSM frame are used for either uplink (data transmission) or downlink (data reception). As noted earlier, this novel technology obviates the need for incorporating an additional receiver or using an advanced and expensive PLL design.

Not only does this technology provide a faster setup time for a dedicated RSSI receive mode, it also reduces power consumption and thus preserves battery life. In other words, this new technology eliminates the need to set up a high-power receive mode that is normally needed to measure RSSI using the traditional approach.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the handheld electronic device.

Figure 12:
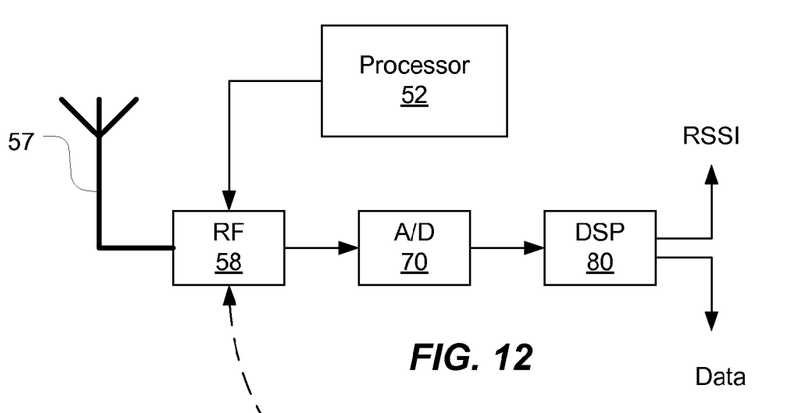
FIG. 12 is a schematic circuit diagram of the RF receiver, A/D converter and DSP used for obtaining RSSI measurements and TDMA data.
Figure 13:
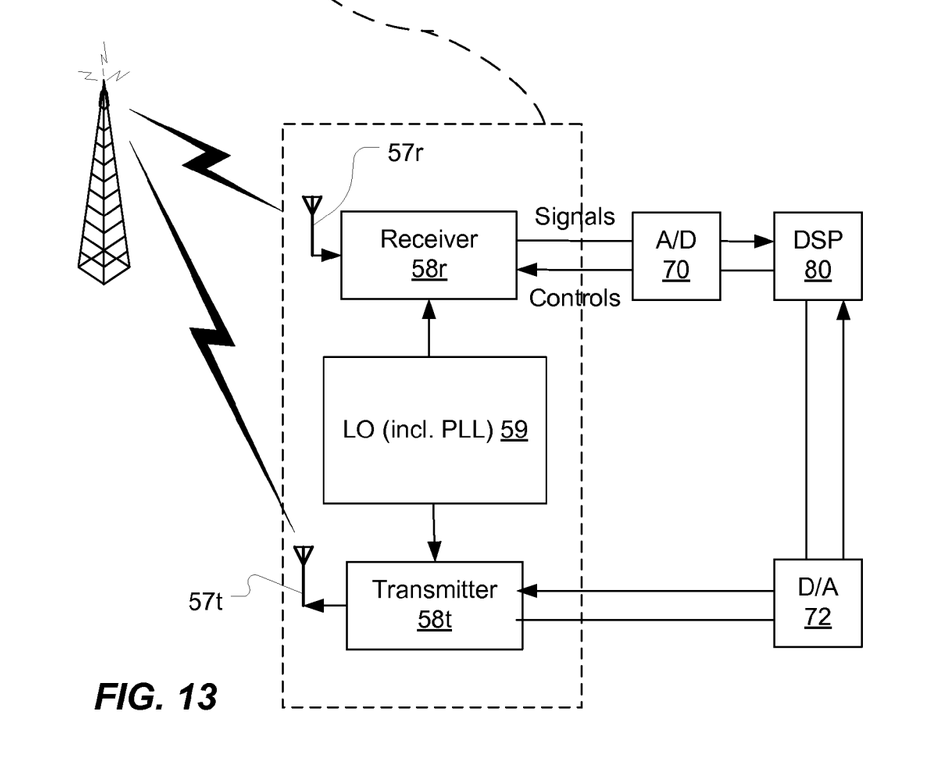
FIG. 13 is a schematic circuit diagram of the RF transceiver chip showing the presence of local oscillators having respective phase-locked loops.

FIG. 12 depicts a simplified schematic circuit diagram showing how the processor 58 of the wireless device can be used to switch the RF chip 58 between a normal receive mode and a fast receive mode (i.e. a dedicated RSSI measurement mode). The data received by the RF chip 58 is processed by the analog-to-digital converter (A/D) 70 and digital signal processor 80. In fast receive mode, the DSP provides an RSSI measurement based on the sampling whereas in the normal receive mode, the DSP receives digital TDMA data for standard digital signal processing. The main components of the RF chip 58 are shown schematically in FIG. 13. The RF transceiver 58 comprises both a receiver 58r and its respective antenna 57r and a transmitter 58t and its respective antenna 57t. The transmitter and receiver have a local oscillator (LO) 59 including a PLL. When the processor instructs the RF chip to enter fast receive mode, sampling begins prior to complete stabilization of the PLL in the LO 59. This enables RSSI measurements to be scheduled in the available space in a given timeslot, thereby enabling the device to handle higher multislot classes.

For the purposes of the present specification, "GSM" is meant to include any of the GSM/UMTS family of mobile communication standards. However, it should be appreciated that the technology described herein can be applied, mutatis mutandis, to other TDMA-based mobile communication systems. This new technology has been described in terms of specific implementations and configurations which are intended to be exemplary only. The scope of the exclusive right sought by the Applicant is therefore intended to be limited solely by the appended claims.

The invention claimed is:

1. A method of transmitting and receiving data using a wireless communications device that is enabled for higher multislot classes in which a plurality of uplink timeslots of each TDMA frame is reserved for transmitting data and a plurality of downlink timeslots of each TDMA frame is reserved for receiving data, the method comprising:
   receiving TDMA data on at least one of the plurality of downlink timeslots reserved for receiving data;
   switching a transceiver of the wireless communications device from a receiver mode to a transmitter mode;
   transmitting TDMA data on at least one of the plurality of uplink timeslots reserved for transmitting data;
   switching the transceiver of the wireless communications device from the transmitter mode to the receiver mode; and
   measuring, with the transceiver operating in the receiver mode, a received signal strength indication (RSSI) by initiating collection of RSSI signal samples prior to complete stabilization of a phase-locked loop (PLL) of the transceiver.

2. The method as claimed in claim 1 wherein switching the transceiver from the receiver mode to the transmitter mode comprises:
   terminating the receiver mode;
   programming the transceiver for the transmitter mode; and
   stabilizing the PLL for the transmitter mode.

3. The method as claimed in claim 1 wherein switching the transceiver from the transmitter mode to the receiver mode comprises:
   terminating the transmitter mode;
   programming the transceiver for the receiver mode; and
   stabilizing the PLL for the receiver mode.

4. The method as claimed in claim 2 wherein switching the transceiver from the transmitter mode to the receiver mode comprises:
   terminating the transmitter mode;
   programming the transceiver for the receiver mode; and
   stabilizing the PLL for the receiver mode.

5. The method as claimed in claim 1 wherein measuring the received signal strength indication (RSSI) comprises:
   programming the transceiver for the receiver mode;
   initiating stabilization of the PLL;
   initiating collection of RSSI signal samples while the PLL is still stabilizing; and
   terminating the receiver mode when a maximum number of RSSI signal samples have been collected, wherein the maximum number of RSSI signal samples is constrained by a remaining space available in a timeslot during which the RSSI is to be measured.

6. The method as claimed in claim 1 wherein measuring the received signal strength indication (RSSI) comprises initiating collection of RSSI signal samples once the phase-locked loop has stabilized the frequency of a local oscillator to within 20 kHz of the carrier frequency.

7. The method as claimed in claim 1 wherein measuring the received signal strength indication (RSSI) comprises initiating collection of RSSI signal samples once the phase-locked loop has stabilized the frequency of a local oscillator to within 10 kHz of the carrier frequency.

8. The method as claimed in claim 1 wherein measuring the received signal strength indication (RSSI) comprises collecting x samples representing 4x qbits where x=((625 qbits per timeslot)−(time required for switching from the transmitter mode to the receiver mode)−(time to program the transceiver for RSSI measurement in the receiver mode)−(time to stabilize the PLL to within 20 kHz of the carrier frequency)−(time to terminate the receiver mode once RSSI measurement is complete))/4.

9. The method as claimed in claim 1 wherein measuring the received signal strength indication (RSSI) comprises collecting x samples representing 4x qbits where x=((625 qbits per timeslot)−(time required for switching from the receiver mode to the transmitter mode)−(time to program the transceiver for RSSI measurement in the receiver mode)−(time to stabilize the PLL to within 20 kHz of the carrier frequency)−(time to terminate the receiver mode once RSSI measurement is complete))/4.

10. The method as claimed in claim 1 wherein the TDMA frame has eight timeslots of which at least six timeslots are reserved for either data transmission or data reception.

11. The method as claimed in claim 1 wherein the TDMA frame has eight timeslots of which at least seven timeslots are reserved for either data transmission or data reception.

12. A non-transitory computer readable medium comprising code which when loaded into memory and executed on a processor of a wireless communications device is configured to cause a radiofrequency transceiver of the wireless communications device to:
   receive TDMA data on at least one of the plurality of downlink timeslots reserved for receiving data;
   switch the transceiver of the wireless communications device from a receiver mode to a transmitter mode;

transmit TDMA data on at least one of the plurality of uplink timeslots reserved for transmitting data;

switch the transceiver of the wireless communications device from the transmitter mode to the receiver mode; and measure, with the transceiver operating in the receiver mode, a received signal strength indication (RSSI) by initiating collection of RSSI signal samples prior to complete stabilization of a phase-locked loop (PLL) of the transceiver.

13. A wireless communications device enabled for higher multislot classes in which a plurality of uplink timeslots of each TDMA frame is reserved for transmitting data and a plurality of downlink timeslots of each TDMA frame is reserved for receiving data, the device comprising:

a radiofrequency transceiver having a phase-locked loop for locking the phase of a local oscillator of the transceiver to the phase of a carrier signal; and a processor for instructing the radiofrequency transceiver to switch between a normal data-receiving mode in which TDMA data is received on reserved downlink slots and a dedicated RSSI-measurement mode for measuring a received signal strength indication (RSSI) wherein collection of RSSI signal strength samples is initiated prior to complete stabilization of the phase-locked loop.

14. The wireless communications device as claimed in claim 13 wherein the processor is configured to initiate collection of RSSI signal strength samples when the PLL has stabilized to within 20 kHz of the carrier frequency.

15. The wireless communications device as claimed in claim 13 wherein the processor is configured to initiate collection of RSSI signal strength samples when the PLL has stabilized to within 10 kHz of the carrier frequency.

16. The wireless communications device as claimed in claim 13 wherein each TDMA frame has eight timeslots of which at least six timeslots are reserved for either data transmission or data reception.

17. The wireless communications device as claimed in claim 13 wherein each TDMA frame has eight timeslots of which at least seven timeslots are reserved for either data transmission or data reception.

18. The wireless communications device as claimed in claim 13 wherein the radiofrequency transmitter operates at a lower power when operating in the dedicated RSSI measurement mode.

19. The wireless communications device as claimed in claim 13 wherein a time lag between initiation of stabilization and initiation of sample collection is a configurable parameter.

20. The wireless communications device as claimed in claim 13 wherein the processor is configured to cause the radiofrequency transceiver to collect a maximum number of RSSI signal samples, where the maximum number is constrained by the remaining space available in a timeslot during which RSSI is measured.

* * * * *